United States Patent [19]

Quermann

[11] 4,438,655

[45] Mar. 27, 1984

[54] FLEXURE SUSPENSION FOR FREE ROTOR GYROSCOPES

[75] Inventor: Thomas R. Quermann, Huntington Station, N.Y.

[73] Assignee: Sperry Corporation, New York, N.Y.

[21] Appl. No.: 742,158

[22] Filed: Nov. 15, 1976

[51] Int. Cl.³ .............................................. G01C 19/22
[52] U.S. Cl. ........................................ 74/5 F; 308/2 A
[58] Field of Search ..................... 74/5 F; 308/2 A; 29/436; 267/160

[56] References Cited

U.S. PATENT DOCUMENTS

| | | | |
|---|---|---|---|
| 2,735,731 | 2/1956 | Freebairn Jr. et al. | 74/5 F X |
| 3,181,851 | 5/1965 | Troeger | 267/160 |
| 3,211,011 | 10/1965 | Litty | 74/5 F |
| 3,290,949 | 12/1966 | Samet | 308/2 A X |
| 3,365,960 | 1/1968 | Siff et al. | 74/5 F X |
| 3,384,424 | 5/1968 | Raines | 308/2 A |
| 3,512,419 | 5/1970 | Stiles | 74/5 F |
| 3,529,477 | 9/1970 | Quermann | 74/5 F |
| 3,610,051 | 10/1971 | Siff et al. | 74/5 F |
| 3,743,268 | 7/1973 | Heiland et al. | 267/160 |
| 3,832,906 | 9/1974 | Craig | 74/5 F |

Primary Examiner—Rodney H. Bonck
Attorney, Agent, or Firm—Howard P. Terry

[57] ABSTRACT

The invention is a suspension system for a two-degree-of freedom flexure-suspended free-rotor gyroscope and a miniature gyroscope incorporating such a flexure system. An axial strut suspension device for controlling the axial position of the rotor includes a series of thin, flat sections, while the radial suspension function is performed by a cross-shaped element of very thin metal, one pair of the diametrically opposed cross ends thereof being affixed to the rotor-driving shaft, while the other pair of opposed cross ends thereof is affixed to the gyroscope rotor.

5 Claims, 8 Drawing Figures

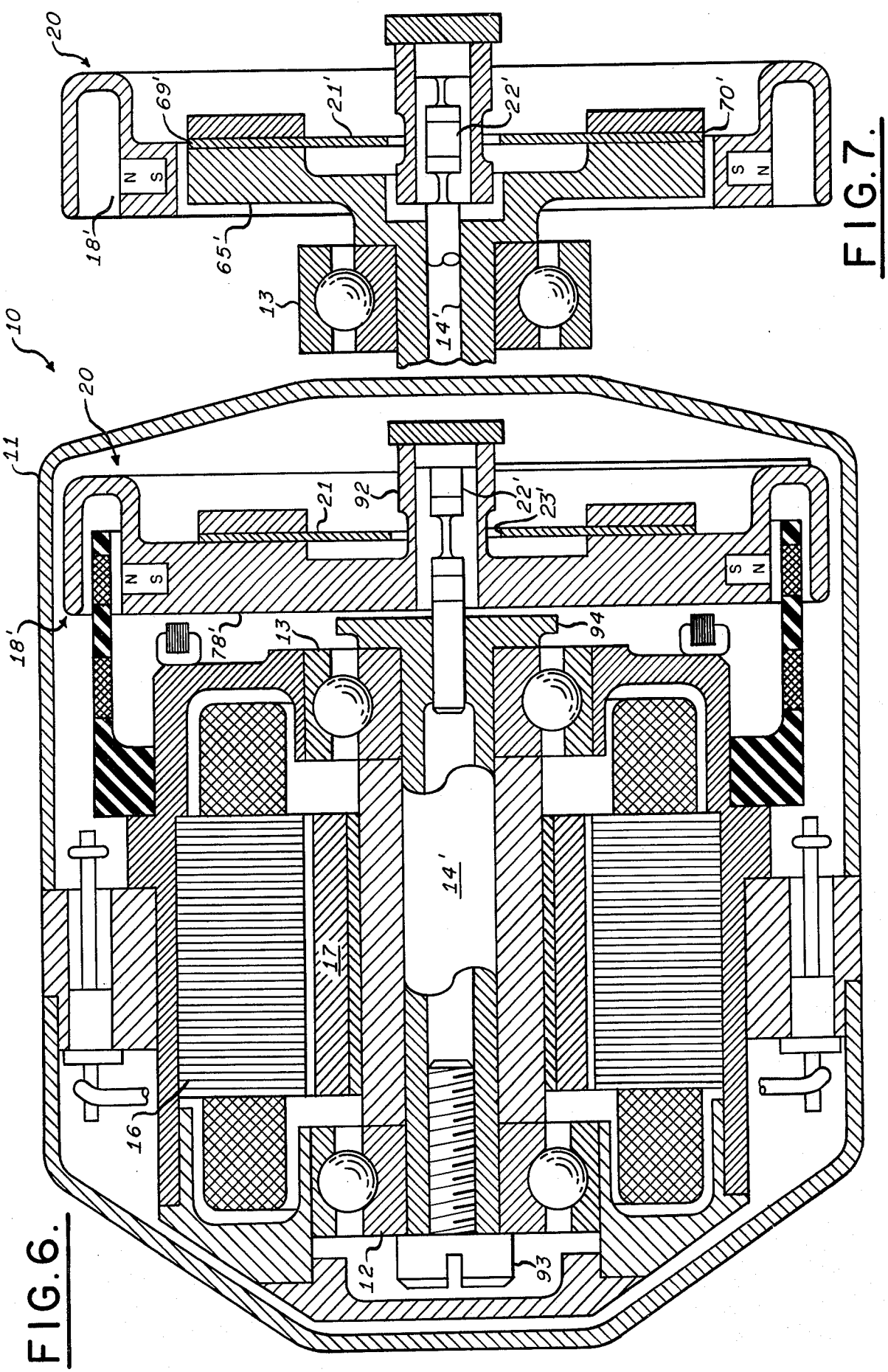

FLEXURE SUSPENSION FOR FREE ROTOR GYROSCOPES

BACKGROUND OF THE INVENTION

1. Field of the Invention

The present invention relates generally to gyroscopic instruments and is more particularly concerned with two-degree-of freedom flexure suspended free-rotor gyroscopes.

2. Description of the Prior Art

Flexure suspended free-rotor gyroscopic devices are found in U.S. patents assigned to Sperry Rand Corporation including:

- W. G. Wing—U.S. Pat. No. 2,719,291—"Rate of Turn Gyroscope", issued Sept. 27, 1955,
- T. R. Quermann—U.S. Pat. No. 3,529,477—"Gyroscopic Rotor Suspension", issued Sept. 22, 1970,
- T. R. Quermann—U.S. Pat. No. 3,557,629—"Pick-Off and Torquing Device", issued Jan. 26, 1971, and
- T. R. Quermann—U.S. Pat. No. 3,677,097—"Protective Stops For Flexure Suspended Gyroscopic Rotor", issued July 18, 1972.

These patents disclose concepts typical of the continuing trend of the design of gyroscopic instruments to achieve smaller, less expensive, and more reliable gyroscopic apparatus for employment in flight control and other precision navigation and stabilization applications.

The aforementioned patents, by way of example, illustrate that there are various ways in which a gyroscope rotor can be attached to a motor-driven shaft to permit angular deflection of the gyroscope rotor with respect to its drive axis and consequent measurement of the deflection for control purposes. Desirable properties for the suspension system include strength and rigidity in all translational directions so that the instrument is relatively immune to damage by acceleration, vibration, and shock. Further, a low spring restraint for the angular displacement system about the input axes is desired so that sensitivity is appropriately high. Further desired inherent qualities relate to isoelasticity, synchronous vibration sensitivity, and adaptability to the incorporation of inertial tuning. In designs using a simple spider radial support element and a cylindrical strut axial support element it is possible to achieve relatively low cost and low sensitivity to undesired effects, especially to twice-rotor-speed vibration, but this is at the expense of relatively high spring restraint. Alternatively, other suspensions that achieve low spring restraint and high translational rigidity require intricate and costly machined parts and redundant suspensions. Also, such configurations require precise balancing adjustment to achieve low sensitivity, especially to twice-rotor-speed vibration.

SUMMARY OF THE INVENTION

The invention is a miniature two-degree-of-freedom flexure-suspended free-rotor gyroscope having novel features overcoming deficiencies of the prior art. The invention finds application as a gyroscope in which the rotor is adapted for spinning about a spin axis by means of a cooperating drive shaft and motor in which a first flexure support system radially supports the gyroscope rotor coaxially on the drive shaft for universal tilting over small angular ranges about axes perpendicular to the spin axis. Further, the position of the gyroscope rotor is axially defined by a second flexure support system extending coaxially through the first flexure support system, again for universal tilting about axes at right angles to the spin axis. An axial strut for performing the latter function includes a series of successively spaced thin, flat sections formed in a cylindrical rod, with the plane of the central flat flexure section lying perpendicular to the common plane of the two companion flat flexure sections. For providing the radial supporting function, a cross-shaped member or spider is formed from very thin sheet metal; one pair of the diametrically opposed cross arm ends is affixed to the motor-driven shaft, while the other pair is affixed to the gyroscope rotor, for example, a central clearance hole in the flexible cross member allowing the axial strut to pass freely therethrough. The versatile invention beneficially finds application in both shaft reference and case reference systems.

BRIEF DESCRIPTION OF THE DRAWINGS

FIG. 6 is an elevation view in cross-section of an alternative or case reference configuration of the device shown in FIGS. 1, 2, and 3.

FIG. 7 is a fragmentary cross-section view taken at ninety degrees to the section shown in FIG. 6.

DESCRIPTION OF THE PREFERRED EMBODIMENTS

Figure 1:
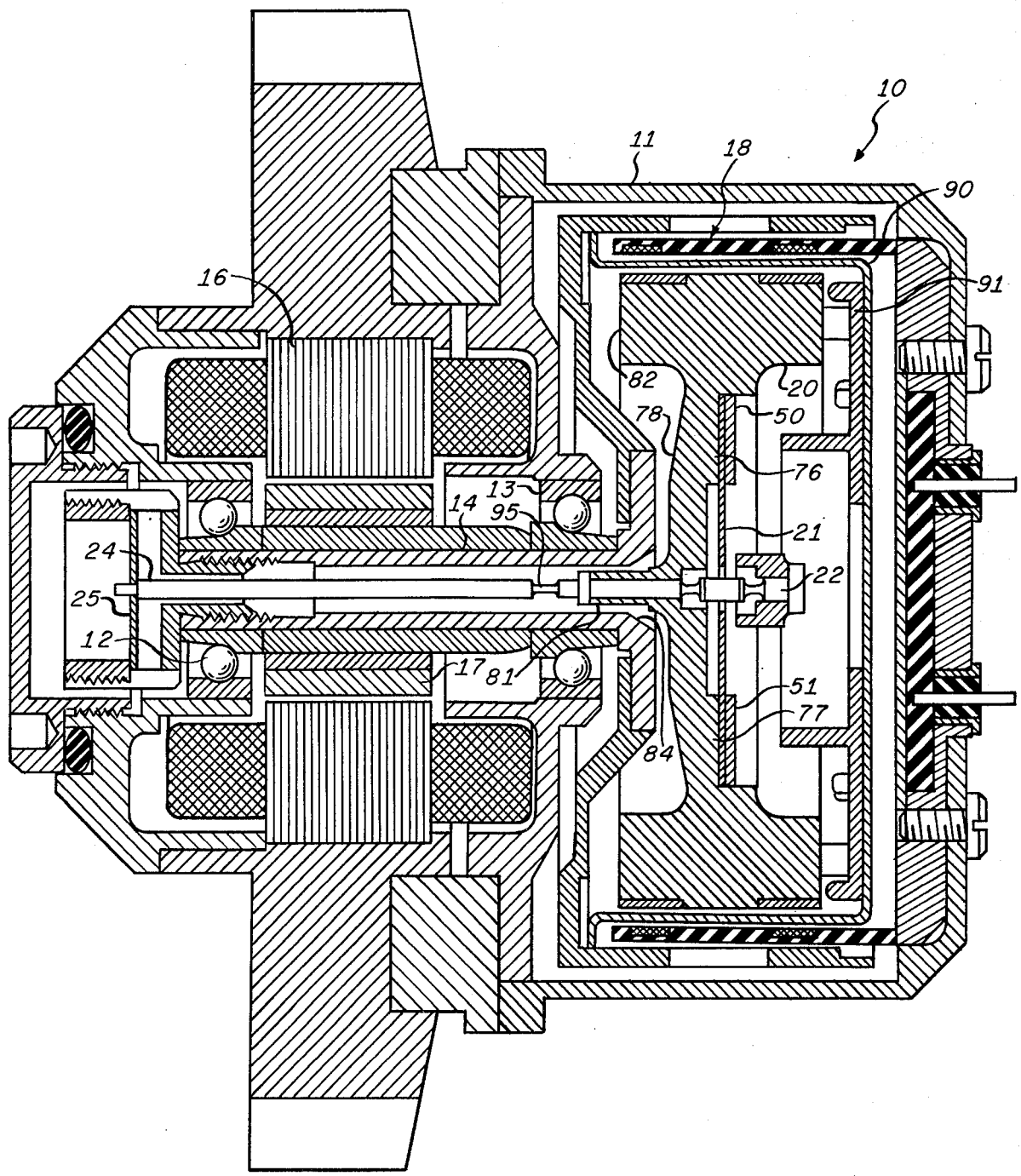
FIG. 1 is an elevation view in cross-section of the novel free-rotor gyroscope rotor flexure support system of the shaft reference type.
Figures 2, 3:
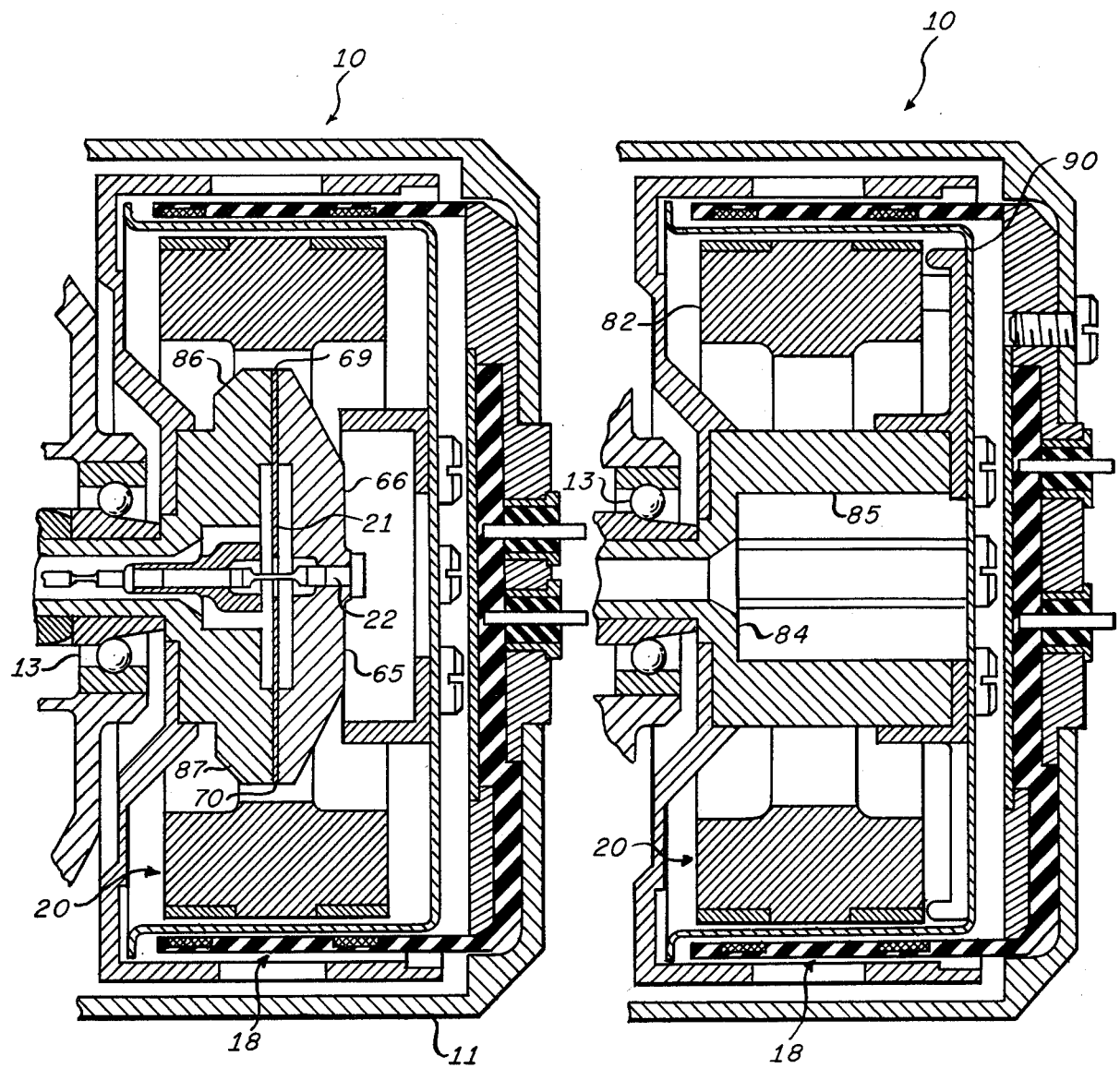
FIG. 2 is a fragmentary cross-section view taken at ninety degrees to the section of FIG. 1.
FIG. 3 is a fragmentary cross section view taken at forty-five degrees to FIGS. 1 and 2.

Referring to FIGS. 1, 2, and 3, a gyroscope 10 according to the invention is shown having a housing 11 within which are mounted anti-friction bearings 12 and 13 that journal a drive shaft 14 about its geometrical spin axis. Drive shaft 14 is rotated by a generally conventional synchronous spin motor having a stator 16 and a rotor 17 of the kind described in the aforementioned patents, for example. A gyroscopic rotor wheel 20 is radially suspended by a flexure support spider 21 shown more clearly in FIG. 4A as having four equiangularly disposed resilient thin flat arms which flexibly support gyroscopic rotor 20 for rotation about the normal spin axis. Gyroscope rotor 20 is supported in the spin axis direction by a further flexure support or strut 22 which has a longitudinal strut axis extending through an aperture 23 in the radial flexure spider 21.

Flexure support 22 has an extension through hollow shaft 14 in the form of a round rod 24 attached to the center of resilient diaphragm 25, the function of rod 24 and diaphragm 25 being explained in detail in the aforementioned U.S. Pat. No. 3,529,477, for example. An angular pick-off system, generally indicated at 18, is provided to detect tilting of the gyroscope rotor wheel 20 about either of two axes perpendicular to the spin axis of the instrument. The pick-off 18 may be of the general kind discussed in detail in the aforementioned patents.

Figure 4A:
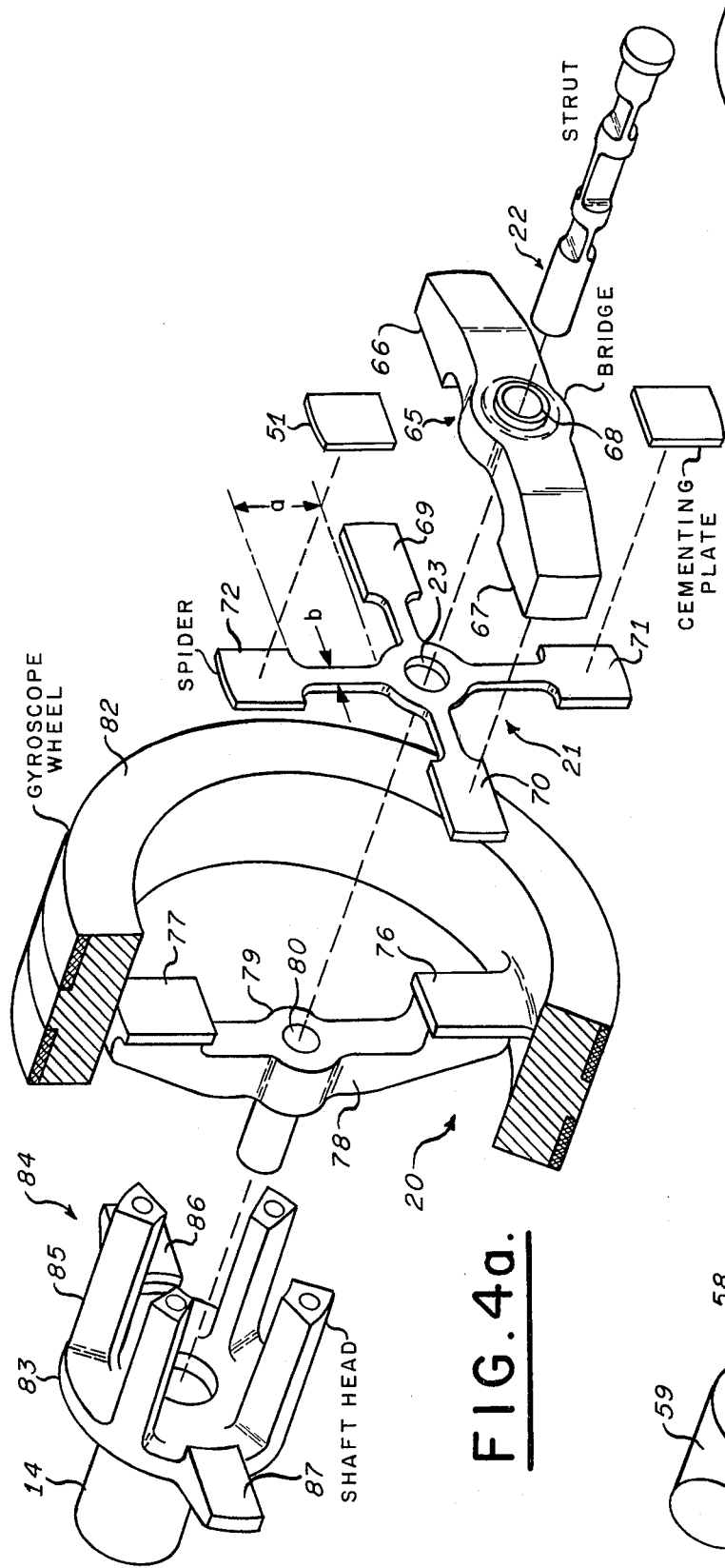
FIG. 4A is a perspective exploded view of elements of the novel suspension.

Now referring particularly to FIG. 4A, the component parts of the novel suspension system will be considered. Continued reference should also be had to FIGS. 1, 2, and 3 for an understanding of the particular disposition of the elements of FIG. 4A with respect to the portion of the instrument already described. The exploded view of FIG. 4A illustrates the general relation of the several parts of the suspension system, including the flexible support strut device 22, the bridge 65, the flexible support spider 21, cementing plates 50, 51, the gyro rotor wheel 20, and the head 84 of spin or drive shaft 14.

The cruciform radial support spider 21 is fabricated from a thin resilient flat metal sheet as a cross-shaped part having a central clearance aperture 23 and four somewhat enlarged pads 69, 70, 71, 72 at the opposed ends of the arms of the cross. In one compact experimental version of the device whose outer case 11' (FIG. 6) was 0.795 inches in diameter and 0.858 inches long, the cross-shaped support had dimensions a=0.054 inches, b=0.037 inches, and was made of a metal sheet 0.001 inches thick and was formed by photo-etching. One pair 69, 70 of diametrically opposed pads is, during assembly, affixed to mating bosses 86 and 87 of shaft head 84. In this instance, and in many other locations, fastening by the use of conventional quick-setting adhesives is accomplished, using epoxy resins or the like. The other pair 71, 72 of pads on the second arm of cross-shaped flexure or spider 21 is affixed by adhesive material to a similar pair of bosses 76, 77 rising from the single spoke 78 of the gyroscope rotor wheel 20. While the locations of the ends of the arms of spider 21 are thus determined by the respective bosses 76, 77, 86, 87, the central portion of support spider 21 is otherwise unconstrained. Unlike prior art radial suspension, such as that of U.S. Pat. No. 3,529,477, the spring restraint of the new suspension is substantially independent of the tension in the suspension arms. This benefit is a result of eliminating substantially all of the bending deflection of such prior suspensions, bending which occurred at a location radially offset from the center of the suspension spider. It will be apparent to those skilled in the art that other conventional mechanical fasteners or fastening methods may be employed in lieu of adhesives.

Figure 4B:
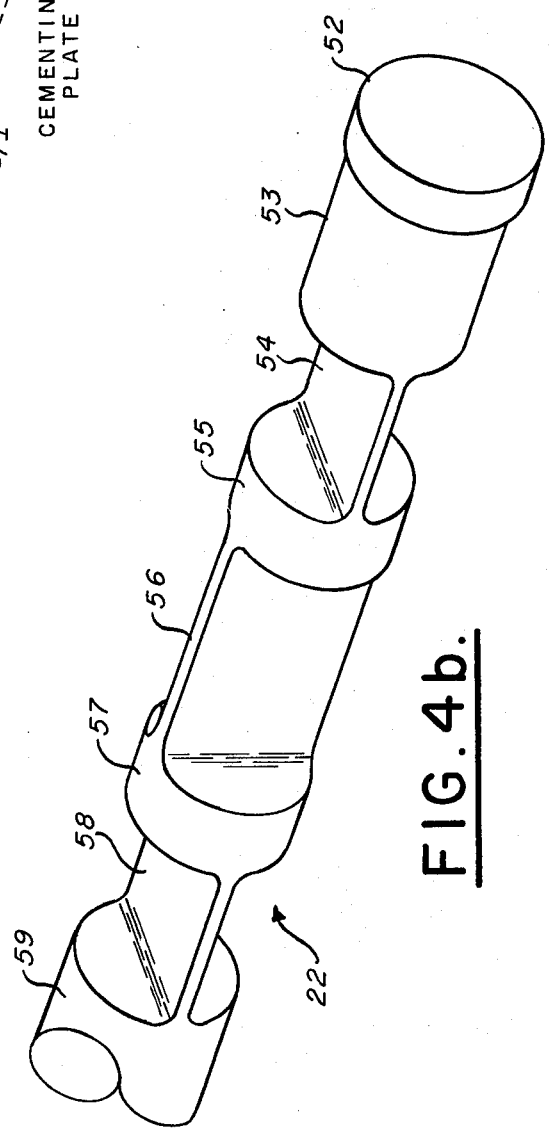
FIG. 4B is an enlarged perspective view of the strut shown on a smaller scale in FIG. 4A.
Figure 5:
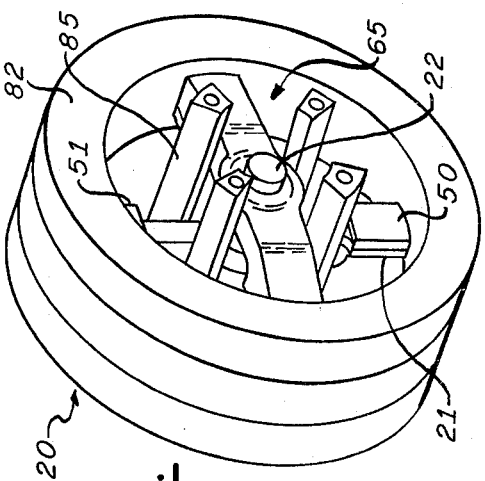
FIG. 5 is a perspective view of an assembly of the parts shown in FIG. 4A.

The axial suspension strut 22 consists of a machined round cylindrical rod shown in more detail in the enlarged view of FIG. 4B as having three flat flexure elements 54, 56, 58 milled in its active flexure region. The cylindrical portion 53 of the rod is affixed to bridge 65 in the central bore 68, while its opposite cylindrical portion 59 is fixed in bore 80 of the spoke 78 of gyroscopic rotor wheel 20. The end flexures 54 and 58 lie in the same plane, a plane perpendicular to the plane of the intermediate flexure 56. Flat flexure element 56 is preferably twice as long as either of the equal length and flexure flat elements 54, 58. Projecting from the face of shaft head 84 are four equally spaced pillars, such as pillar 85 which, as seen in FIG. 3, provide a ready support for the stop plate 91 and an annular windage loss-inhibiting cup 90. Made of a conventional material having low magnetic permeability such as inconel, interaction is permitted between the parts of pick-off 18 while, at the same time, fluid coupling between the rotor and the case is eliminated.

It will be understood by those skilled in the art that, in FIGS. 1 and 2, certain parts shown in other figures are omitted, such as the pillars 85 of the shaft head seen in FIG. 3. Also, certain parts are omitted in FIG. 3 so as to permit the drawing to show clearly how shroud 90 and limit stops 91 are supported.

The novel suspension system provides translational rigidity along three mutually perpendicular axes and a very low torsional restraint with a simple, low cost configuration having an inherently low sensitivity to twice-rotor-speed vibration. The use of the series of three flat flexure elements of FIG. 4B, rather than of the single round cylindrical flexure of the prior art, results in a significant reduction in the flexural rigidity of support strut 22. In a particular but representative suspension, and for a given axial load capacity, the multiple-flat flexure device provided a reduction in stiffness by a factor of six with respect to the formerly used cylindrically round flexure element. The use of the three flat flexure elements 54, 56, 58 of FIG. 4B advantageously keeps the center of flexing constant, no matter what the direction of deflection of gyroscope rotor wheel 20. As shown in FIGS. 1 and 2, the intermediate flat flexure element 56 is centered in the aperture 23 in the cruciform radial flexure spider 21.

In operation, all radial and drive motor torque loads on the rotating system are carried by cruciform suspension spider 21. Member 21 accommodates tilt of the gyroscope rotor wheel 20 with respect to drive shaft 14 by twisting deflection of its arms. In fact, the central part of the cross-shaped suspension spider 21 may be likened to the intermediate gimbal of a Hooke's universal joint. Because this effective gimbal is formed from the extremely thin metal film of cruciform suspension 21, it is inherently mass-balanced with respect to the two mutually perpendicular pivot axes and the gyroscope thus has a low inherent sensitivity to twice rotor speed vibration.

In operation, all axial loads on the rotating system are carried by the triple flexure support strut 22. As previously noted, strut 22 is proportioned with the flat intermediate flexure element 56 twice as long as each of the two flat end flexure elements 54, 58. Such a configuration has equal flexural stiffness in any deflection direction, as well as equal column strength. Although the axial support of the effective central gimbal portion of the radial suspension is soft, the extremely low mass of the effective gimbal prevents an excessive anisoelastic acceleration sensitivity. However, if mass is to be added to this portion of the novel suspension to achieve inertia tuning, excessive anisoelasticity may result. Accordingly, it is intended that the suspension be used in conjunction with a spring compensation system such as the toggle strut configuration shown at 95 in FIGS. 1 and 2 and as taught in the aforementioned U.S. Pat. No. 3,529,477. Alternatively, a known permanent magnet toggle system, such as described in the aforementioned U.S. Pat. No. 2,019,291 may be substituted.

The preferred shaft reference embodiment of the invention thus far presented is of particular value in instruments which must maintain their calibration over long periods of time even when subjected to handling shocks and temperature variations which might cause minute shifting in the relative positions of the various parts. The shaft reference configuration of FIGS. 1 through 5 is particularly advantageous in overcoming the effects of any instability in the location of the spin axis of the gyroscopic rotor in that no constant change in the pick-off system null position with respect to the torque-producing constraints on the gyroscope wheel is induced by such instability.

For certain other applications, the structure of the device may be simplified as shown in FIGS. 6 and 7, thus further reducing the size and cost of the instrument. Should an undesired bias signal appear in the electrical output of the pick-off system 18', such errors may be externally cancelled, for example, as provided for in the aforementioned U.S. Pat. No. 3,557,629.

Parts in FIGS. 6 and 7 analogous to those in the preceding figures bear similar reference numerals. It will be noted that drive shaft 14' supports a yoke or bridge 65' to which are fastened the end pads 69', 70' of one arm of the cruciform or spider suspension 21'. The tubular hub 92 now supports the spokes 78' of gyroscope rotor wheel 20' which bears at its periphery a variable reluctance type of deflection pick-off system 18' well known in the gyroscopic art.

In FIGS. 6 and 7, the axially disposed triple flexure strut system 22' is affixed at one end of its axis through hollow tube 92 to spoke 78', while strut system 22' is fixed at its opposite end in a bore in the hollow drive shaft 14'. The opposite end of hollow shaft 14' is provided with a machine screw 93 mating with a thread internal of hollow shaft 14'. The races of ball bearings 12 and 13 are confined between a flanged portion 94 from which bridge 65' extends and the head of machine screw 93 when the latter is tightened. Operation of the device is generally similar to that of FIGS. 1 through 5. The suspension spring compensation system (not shown) may be of the magnetic toggle type discussed in U.S. Pat. No. 2,719,291.

Accordingly, it will be understood that the novel suspension system overcomes significant defects of the prior art while providing a configuration susceptible of use in an extremely small and compact instrument in which parts may be manufactured by inexpensive techniques, including photo-etching. Parts may be joined by inexpensive adhesives eliminating operations required in the use of conventional fasteners. The parts may be made sufficiently strong that complex elements, such as the stops required in prior art instruments and described in U.S. Pat. No. 3,677,097 are no longer needed and still remain sufficiently flexible for proper sensitivity of the instrument. The instrument is still adaptable for use with a variety of known pick-off-torquer designs. The double-rotor frequency vibration problem is eliminated without the prior art expedient of using multiple, redundant tuned gimbal systems. The novel suspension is advantageously not rotor-speed sensitive, so that a rotor speed or frequency control is not required. In fact, the novel suspension is useful in systems where the presence of H-modulation capability is required. The novel gyroscope construction is furthermore useful in applications requiring a cooperating pair of flexure mounted gyroscopes, as the rotors may be operated at spaced frequencies, thus eliminating the possibility of adverse mechanical coupling between pairs of gyroscopes of the prior art type when operated in the same gimbal system. Low flexural restraint and high sensitivity are easily attained.

While the invention has been described in its preferred embodiments, it is to be understood that the words which have been used are words of description rather than of limitation and that changes may be made without departing from the true scope and spirit of the invention in its broader aspects.

I claim:

1. In gyroscopic apparatus having gyroscopic rotor means adapted for spinning about a spin axis by means of drive shaft means, improved rotor suspension means comprising:
   first support means radially supporting said gyroscopic rotor means for rotation with said drive shaft means for universal tilting about axes substantially perpendicular to said spin axis,
   second support means coupled to said drive shaft means for rotation therewith substantially about said spin axis and axially supporting said gyroscopic rotor means for universal tilting about said axes substantially perpendicular to said spin axis,
   said second support means comprising cylindrical strut means having a strut axis and a first flexible parallel sided flat section lying in the plane of said strut axis,
   said second support means extending through an aperture in said first support means with substantially equal parts of said first flexible parallel sided flat section on either side of said aperture, and
   second and third flexible parallel sided flat sections lying in the plane of said strut axis and symmetrically spaced on either side of said first flexible parallel sided flat section,
   said second and third flexible parallel sided flat sections being disposed at right angles to said first flexible parallel sided flat section.

2. Apparatus as described in claim 1 wherein said first flexible parallel sided flat section is twice as long in the direction of said strut axis as either of said second and third flexible parallel sided flat sections.

3. Apparatus as described in claim 2 wherein said first flexure support means comprises symmetric cruciform resilient means having substantially equal length arms with outer extremities for coupling said gyroscopic rotor means to said drive shaft means, said first flexure support means being otherwise unconstrained adjacent said spin axis.

4. Apparatus as described in claim 3 wherein:
   the said outer extremities of first and second diametrically opposed arms of said equal length arms are coupled to said rotor means, and
   the said outer extremities of third and fourth diametrically opposed arms of said equal length arms are coupled to said drive shaft means,
   whereby to provide articulation of said rotor means with respect to said drive shaft means substantially only by cyclic twisting of said first, second, third, and fourth opposed arms.

5. In gyroscopic apparatus having gyroscopic rotor means adapted for spinning about a spin axis by means of drive shaft means, improved rotor suspension means comprising:
   first support means radially supporting said gyroscopic rotor means for rotation with said drive shaft means for universal tilting about axes substantially perpendicular to said spin axis,
   second support means coupled to said drive shaft means for rotation therewith substantially about said spin axis and axially supporting said gyroscopic rotor means for universal tilting about said axes substantially perpendicular to said spin axis,
   said second support means comprising cylindrical strut means having a strut axis and a first flexible parallel sided flat section lying in the plane of said strut axis, said second support means extending through an aperture in said first support means with substantially equal parts of said first flexible parallel sided flat section on either side of said aperture, and second and third flexible parallel sided flat sections lying in the plane of said strut axis and symmetrically spaced on either side of said first flexible parallel sided flat section, said second and third flexible parallel sided flat sections being disposed at right angles to said first flexible parallel sided flat section, said first flexible parallel sided flat section being twice as long in the direction of said strut axis as either of said second or third flexible parallel sided flat sections, whereby the center of flexure of said second support means remains constant and said rotor suspension means is insensitive to twice-rotor-speed vibration.

* * * * *